F. P. LARSON.
TIRE CHAIN.
APPLICATION FILED OCT. 1, 1913.
1,098,043.
Patented May 26, 1914.
FIG. 1.
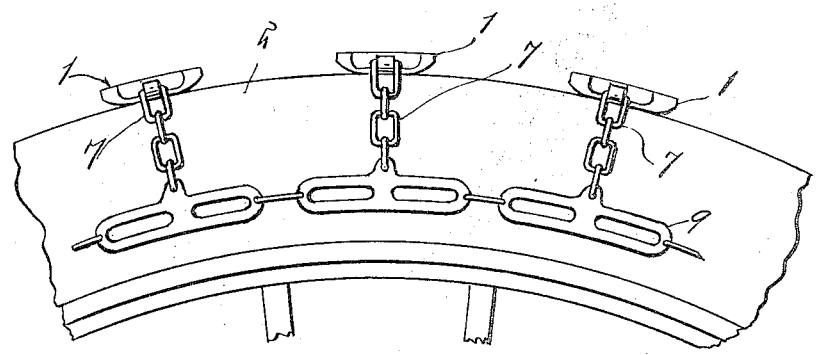
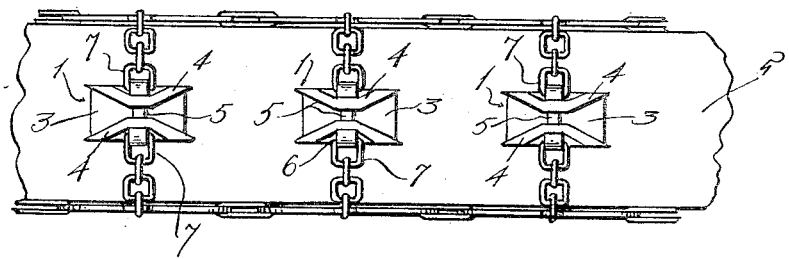
FIG. 2
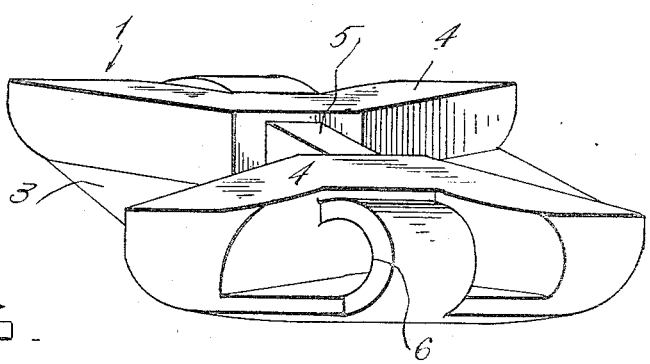
FIG. 3.
Witnesses
Inventor
F. P. Larson
By
Attorneys

UNITED STATES PATENT OFFICE.

FRANK P. LARSON, OF CHICAGO, ILLINOIS.

TIRE-CHAIN.

1,098,043.  Specification of Letters Patent.   Patented May 26, 1914.

Application filed October 1, 1913. Serial No. 792,899.

*To all whom it may concern:*

Be it known that I, FRANK P. LARSON, a citizen of the United States, residing at Chicago, in the county of Cook, State of Illinois, have invented certain new and useful Improvements in Tire-Chains; and I do hereby declare the following to be a full, clear, and exact description of the invention; such as will enable others skilled in the art to which it appertains to make and use the same.

The present invention is directed to improvements in tire chains, and has for its object to so construct a device of this character that the same may be easily and quickly applied to a tire, and is an improvement upon my patent issued Aug. 12, 1913, #1,069,885.

With this and other objects in view, this invention resides in the novel features of construction, formation, combination and arrangement of parts to be hereinafter more fully described, claimed and illustrated in the accompanying drawing, in which:—

Figure 1 is a fragmentary side elevation. Fig. 2 is a fragmentary plan view. Fig. 3 is a perspective view of one of the plates.

The device comprises a plurality of circular series of tread plates 1, which are arranged in spaced relation upon the tread of the pneumatic tire 2. The tread plates 1 comprise bases 3 which are adapted to have their inner surfaces placed in engagement with the tread of the tire 2. Formed upon the outer surface of each base 3 of the tread plates are ribs 4, said ribs being curved toward each other with their centers spaced a short distance apart, said centers being connected by a transverse integrally formed rib 5, said rib being also formed integral with the base 3. The outer faces of the ribs 4 have formed integral therewith eyes 6 which are engaged by one of the ends of the chain sections 7, the other ends of which are connected to the ears 8 carried by the sheet metal links 9 which are arranged upon opposite sides of the tire 2, said links having their adjacent ends connected as disclosed in my Patent #1,069,885 hereinbefore referred to.

From the foregoing description it will be seen that a tire chain or armor has been provided which can be easily and quickly applied to a tire, and when in place thereon will prevent skidding when the vehicle is passing over slippery road-beds.

What is claimed is:—

A tire chain or armor comprising a circular series of tread engaging plates consisting of bases, ribs formed integral with the bases and arranged longitudinally thereof, said ribs being curved inwardly and connected at their centers by transverse ribs, eyes formed upon the outer surfaces of the first named ribs, and means engaging said eyes for holding the tread plates upon a tire, as and for the purpose set forth.

In testimony whereof, I affix my signature, in the presence of two witnesses.

FRANK P. LARSON.

Witnesses:
 JOHN A. HIGHGATE,
 NIELS C. ANDERSEN.